United States Patent [19]

Rumreich

[11] Patent Number: 5,133,009
[45] Date of Patent: Jul. 21, 1992

[54] METHOD AND APPARATUS FOR DEFEATING THE OPERATION OF AN IC BUILT-IN NOISE INVERTER

[75] Inventor: Mark F. Rumreich, Indianapolis, Ind.

[73] Assignee: Thomson Consumer Electronics, Inc., Indianapolis, Ind.

[21] Appl. No.: 592,047

[22] Filed: Oct. 4, 1990

[51] Int. Cl.$^5$ .............................................. H04N 7/167
[52] U.S. Cl. ...................................... 380/10; 358/177; 358/178
[58] Field of Search .......................... 380/10, 15, 20; 358/174, 177, 178, 176

[56] References Cited

U.S. PATENT DOCUMENTS

| | | | |
|---|---|---|---|
| 3,582,551 | 6/1971 | Krug | 358/177 X |
| 3,898,380 | 8/1975 | Wilcox | 358/177 |
| 4,417,277 | 11/1983 | Tonomura et al. | 358/177 |
| 4,670,904 | 6/1987 | Rumreich | 380/15 |
| 4,706,285 | 11/1987 | Rumreich | 380/10 X |
| 4,827,511 | 5/1989 | Masuko | 380/15 |

OTHER PUBLICATIONS

"Standard Baseband (Audio/Video) Interface Between NTSC TV receiving Devices & Peripheral Devices"; *EIA Interim Standard*; Mar. 1989; pp. 1-23; EIA/IS-1-5-A.

*Primary Examiner*—Tod Swann
*Attorney, Agent, or Firm*—Joseph S. Tripoli; Peter M. Emanuel; Frederick A. Wein

[57] ABSTRACT

Apparatus for defeating a noise inverter disposed within the IC includes circuitry for changing the amplitude of the AGC signal applied to an AGC amplifier prior to the noise inverter so as to lower the level of the signal fed to the noise inverter. As a result, the signal fed to the noise inverter is less than the threshold signal level necessary for operation of the noise inverter. This enables use of an EIA multiport standard decoder with a standard television signal processing IC wherein the noise inverter is not directly accessible for defeating it.

8 Claims, 3 Drawing Sheets

METHOD AND APPARATUS FOR DEFEATING THE OPERATION OF AN IC BUILT-IN NOISE INVERTER

BACKGROUND

The present application concerns a television receiver having an integrated circuit with a built-in noise inverter circuit and external circuitry for defeating the operation of the noise inverter, e.g., in order to process a scrambled television signal.

In subscription television systems premium or pay television signals are transmitted "over the air", or via a cable network, or satellite in some scrambled form. Such signals are descrambled for viewing by means of a suitable decoder associated with the television receiver of an authorized system subscriber. The decoder is usually situated in a converter unit located external to the television receiver. The television signals may be grouped into several levels, or tiers, each representing a different programming category such as sporting events, movies, etc. The decoder of a particular subscriber is authorized to descramble the television signals in selected categories or channels, with the television signals in remaining unauthorized categories or channels being coupled to the television receiver in scrambled form.

A horizontal synchronization signal suppression technique is often used to scramble the television signal. In such a "suppressed sync" technique, scrambling is accomplished by suppressing the horizontal image synchronizing (sync) pulse component of the television signal. This causes the horizontal deflection system of the receiver to lock onto random video signal peaks during the active video line trace interval, rather than locking onto the actual horizontal sync pulses during the retrace interval, thereby producing an unstable and thereby unviewable displayed image.

Each system subscriber is provided with a decoder unit having a "front end" circuit which includes conventional tuning, intermediate frequency (IF) and video detection stages. Also, an automatic gain control circuit is provided within the decoder for controlling the gain of the tuning and IF stages in accordance with the output of the video detection stage. A sync restoration circuit operates during the suppressed sync pulse interval of the video signal developed at the output of the video detector stage for producing standard horizontal sync pulses. These sync pulses are continuously inserted in the video signal developed at the output of the video detector stage for producing a "descrambled" video signal suitable for viewing on a standard television receiver. The descrambled video signal with restored sync pulses is afterwards impressed on a standard television channel RF carrier signal by means of an RF modulator, and then coupled as a descrambled RF television signal to an antenna input of the television receiver.

Each decoder may additionally include a decode authorization circuit storing a unique subscriber code which is compared to a subscriber authorization code transmitted during a horizontal line of the vertical blanking interval of the television signal. If the stored subscriber code and the transmitted subscriber authorization code compare favorably, a decode authorization signal is developed for enabling the decoder, which is otherwise disabled.

Decoder systems for descrambling a suppressed sync video signal are discussed in U.S. Pat. No. 4,408,225 of Ensinger, et al., for example.

Television receivers commonly include a video signal responsive noise suppression circuit, such as a noise inverter, for suppressing noise pulses which occur during sync pulse intervals of the video signal by means of a signal inverting or equivalent technique. This action prevents noise pulses from disrupting the operation of subsequent sync separator circuits, and also prevents noise pulses from interfering with automatic gain control (AGC) action of the receiver.

The presence of a video signal responsive noise suppression circuit such as a noise inverter in a television receiver may adversely affect the processing of a scrambled television signal such as a suppressed sync signal. For example, in a suppressed sync type of scrambled signal, vertical blanking interval signal components should not be suppressed when the vertical blanking interval contains coded information, typically in digital (binary) form, for use by the scrambled signal decoder. The coded information may represent an authorization code for enabling the decoder to operate, a code which identifies the type of scrambling used, or a code which assists in the descrambling process in some other way.

In a video signal processing system which is subject to processing a scrambled video signal and which includes a noise suppression network such as a noise inverter responsive to video signals, it is desirable to include apparatus for defeating or disabling the operation of the noise suppression network during a descrambling operation to prevent distortion of coded information occurring during prescribed intervals such as vertical blanking intervals.

The size, cost and complexity of a decoder are increased by the need for the decoder to include an RF tuning stage, IF stage, video detector stage, AGC stage, and RF modulator, which stages (except for the modulator) duplicate stages already found in the "front end" of a television receiver. Thus it is desirable to provide a decoder which does not require such stages. Accordingly, the Electronic Industry Association (EIA) of the United States has proposed a decoder-receiver interface standard which simplifies the design of decoders for use in suppressed sync television signal systems for eliminating the need for the aforementioned tuning, IF, detector, AGC, and modulator stages in a suppressed sync decoder unit. As outlined in EIA Consumer Products Standard IS-15 "NTSC Television Receiver Audio/Video Baseband Interface Specification," the EIA decoder standard provides a mutually agreeable convention, to both television receiver manufacturers and the subscription TV industry, for the implementation of a standardized sync suppressed video decoder system.

One of the major impediments to implementation of the multiport standard has been the difficulty of disabling or defeating the operation of the noise inverter internally built into integrated circuits (ICs) commonly used in processing video signals in television receivers. Heretofore, specially designed integrated circuits had to be used which were designed for permitting the noise inverter to be selectively disabled or defeated. Approaches using such specially designed integrated circuits are described in U.S. Pat. No. 4,670,904 of the same inventor and is assigned to the predecessor of interest of the present assignee. In the arrangement described in the '904 patent, the operation of the noise inverter is selectively controlled by a comparator on the integrated circuit having a terminal accessible external to the IC for activation of the comparator in order to disable the noise inverter when the decoder is operating. Additionally, the magnitude of the AGC voltage is changed when the decoder is operative for activation of the comparator. However, this arrangement employs an IC specifically designed to provide for such selective disablement.

There are many video signal processing ICs which are commonly available for utilization in television receivers which do not have provisions for defeating the operation of the noise inverter and therefore do not lend themselves for use with a decoder.

Accordingly, it is desirable to be able to defeat the operation of the built-in noise inverter of a "standard" or "off-the-shelf" IC designed for video signal processing so that a receiver/decoder according to the EIA multiport standard can be implemented with such standard ICs.

SUMMARY OF THE INVENTION

Briefly, the present invention relates to apparatus for defeating a particular signal processing circuit of a standard signal processing integrated circuit which does not have an external access terminal or pin for defeating the signal processing circuit by modifying a feedback signal produced after the signal processing circuit and available via an external accessible terminal. In the exemplary embodiment, the signal processing circuit is a noise inverter and the IC does not include apparatus for controlling the noise inverter via an access terminal. However, the operation of the noise inverter is defeated by modifying an automatic gain control (AGC) signal fedback to a gain control stage via an AGC filter terminal. Specifically, the operation of the noise inverter is defeated by changing the amplitude of the feedback AGC signal for changing the gain of amplifier stages preceding the noise inverter so that the signal fed to the noise inverter does not exceed a threshold level required for operation of the noise inverter. This enables use of an EIA multiport standard decoder with a standard IC in which the noise inverter is not directly defeatable.

DETAILED DESCRIPTION OF THE PREFERRED EMBODIMENT

Figure 1:
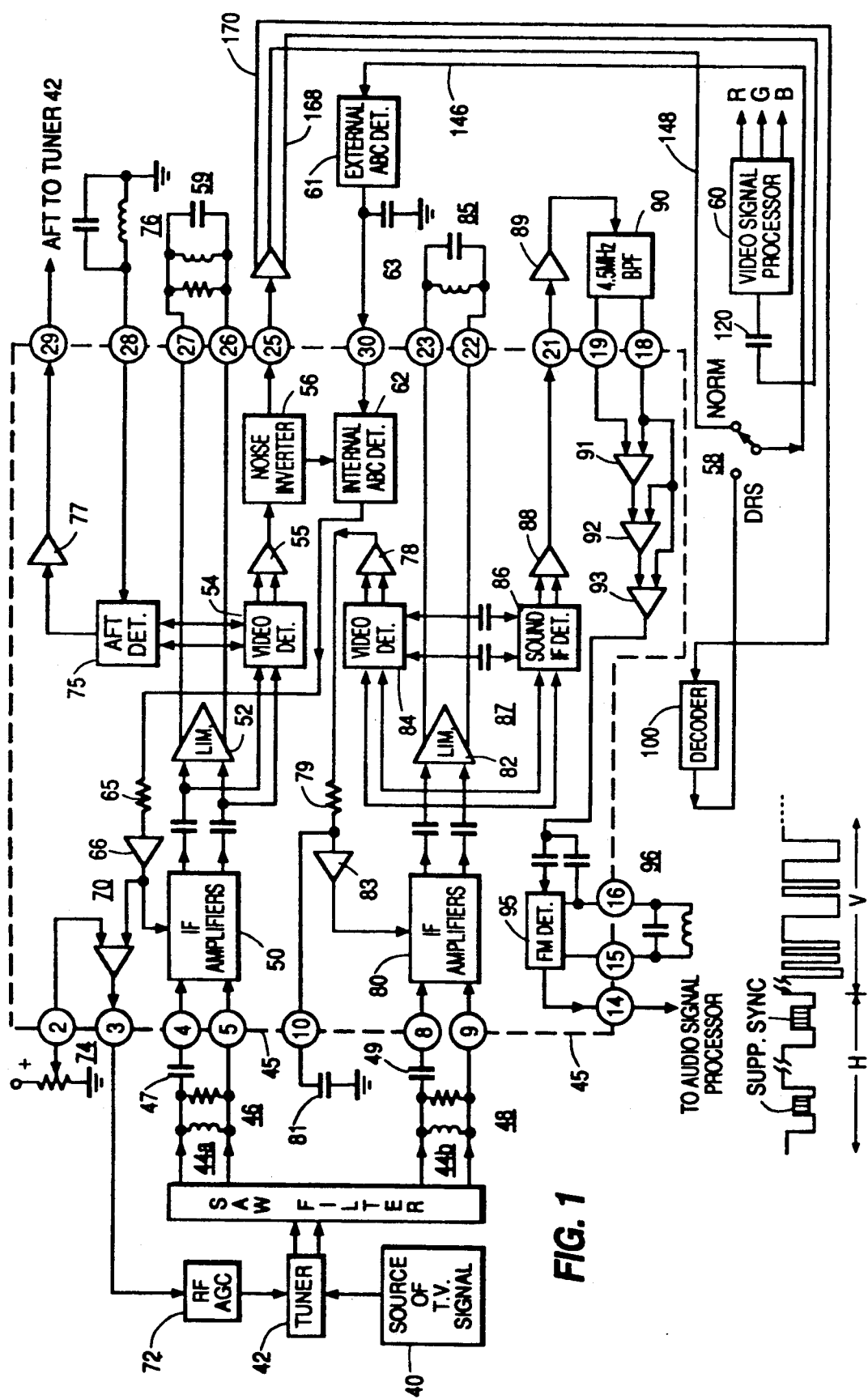
FIG. 1 shows a portion of a television receiver with apparatus according to the present invention coupled to a decoder including suppressed sync restoration apparatus.

Referring now to FIG. 1, a source 40 is a source of RF television (TV) signals which can include suppressed sync scrambled RF TV signals such as may be provided by a cable TV subscription service. In some systems the television signal may contain digital information in reference portions of, e.g., vertical blanking intervals. The digital information represents coded data which may be used by a scrambled signal decoder as previously discussed.

Briefly, the RF signals from source 40 are coupled to a television receiver having, e.g., including a tuner 42, surface acoustic wave (SAW) filter 44, and other units as will be discussed more fully hereinafter, where the television signal is demodulated to produce scrambled video and sound representative signals. A decoder unit 100, external to the receiver, restores the sync component of the scrambled video signal, and the restored sync (unscrambled) video signal is processed by the receiver in a conventional fashion to produce an image on a CRT.

More specifically in FIG. 1, tuner 42 receives the RF signals from source 40 and in a mixer (not shown) translates the RF signal of a selected TV channel to an intermediate frequency (IF) signal including video and sound carriers at, e.g., in the United States, 45.75 MHz and 41.25 MHz, respectively. The IF signal includes an amplitude modulated (AM) video carrier of the vestigial sideband type representing the composite video information, and a frequency modulated (FM) sound carrier containing the sound information.

In the exemplary embodiment, the IF input signal received from tuner 42 is coupled via a preamplifier (not shown) and an adjacent channel sound trap (not shown) into two separate channels for sound and video information demodulation according to quasi-parallel practices via the dual channels of SAW filter 44. Additionally, in the exemplary embodiment, the integrated circuit (IC) discussed is an integrated circuit No. TA8360 manufactured by the Toshiba company of Japan.

A first differential output 44a of the SAW filter 44 associated with the video channel is coupled to signal input terminals 4 and 5 of an integrated circuit network 45 via an inductance-resistance circuit 46 which tunes out the capacitance normally associated with the SAW filter output, and via an AC coupling capacitor 47. The video channel portion of SAW filter 44 associated with output 44a exhibits a response which matches the vestigial sideband video component of the IF signal and which attenuates the 41.25 MHz sound carrier signal.

The quasi-parallel sound channel portion of SAW filter 44 associated with a sound output 44b is coupled to signal input terminals 8 and 9 of integrated circuit network 45 in the same manner as the video component via an inductance-resistance circuit 48 and via an AC coupling capacitor 49. The sound channel portion of SAW filter 44 at sound output 44b exhibits a double humped response with a first peak amplitude response at the sound carrier frequency and a second peak amplitude response at the video carrier frequency for providing a video carrier stripped of video modulation to the sound demodulator for providing a relatively buzz free 4.5 sound intercarrier frequency signal after the first sound detector.

In the video IF channel, the video component of the IF signal at input terminals 4 and 5 of integrated circuit network 45 is coupled to an IF amplifier stage 50 which includes a plurality of gain controllable IF amplifiers (not shown). The amplified video component from stage 50 is AC coupled to a limiter 52 and to a video detector 54 (e.g., a four quadrant multiplier). A bandpass filter tank circuit 59 coupled via terminals 26 and 27 to the output of limiter 52 is tuned to the video carrier frequency of 45.75 MHz. Limiter 52, filter 59, and video detector 54 form a quasi-synchronous video detector for producing a baseband composite video signal at the output of detector 54. The composite detected video signal is coupled via an amplifier 55 to a noise inverter (NI) 56 which in this case normally alters black-going blanking interval noise pulses below a given threshold level to prevent the noise pulses from disrupting the operation of subsequent sync separator circuits (not shown) and to prevent the noise pulses from interfering with automatic gain control (AGC) action. The operation of noise inverter 56 will be described in detail with reference to FIG. 2.

Briefly, as will be discussed more fully hereinafter, the baseband video signal output of noise inverter 56 is coupled via a terminal 25, to a buffer amplifier 57, switch 58, and a video signal processor 60 including, e.g., sync separator, luminance and chrominance frequency selection, and luminance and chrominance processing circuits for developing R, G, and B color image representative signals for forming an image on a CRT. A signal derived from the output signal of noise inverter 56 is also coupled to an external AGC detector 61 and from there to an internal AGC detector 62. In the exemplary embodiment, internal AGC detector 62 detects the peak of the horizontal sync component of the baseband video signal after noise inversion (suppression) to develop an AGC control voltage related to the magnitude of the sync component. The AGC voltage is normally directly coupled at terminal 30 via an AGC filter network, capacitor 63. AGC amplifier 66 is coupled to a gain control input of IF amplifier stage 50 for controlling the gain of the amplifiers within stage 50 in accordance with the level of the AGC detected sync pulse to maintain a desired nominal signal gain for the video IF channel. The AGC output voltage from AGC amplifier 66 is also applied to an RF AGC comparator amplifier 70, which provides an amplified AGC voltage to a gain control input of tuner 42 via an RF AGC circuit 72. RF AGC circuit 72 is of conventional design and includes a comparator responsive to a reference voltage and to the AGC voltage derived from terminal 30 for providing an output gain control signal which determines the gain status of tuner 42. A potentiometer 74 coupled via a terminal 2 to a reference input of comparator 70 establishes the operating threshold of RF AGC comparator 70 to determine the point at which comparator 70 conveys the AGC control voltage to circuit 72.

An automatic fine tuning (AFT) detector 75, operatively associated with a bandpass filter tank 76 tuned to the 45.75 MHz video carrier, responds to the amplitude limited video IF carrier signal from limiter 52 for developing an AFT voltage which is coupled via a buffer amplifier 77 and a terminal 29 to an AFT control input of tuner 42 to maintain proper tuning.

In the sound IF channel, the IF signals at terminals 8 and 9 including sound and video components is coupled to an IF amplifier stage 80 which includes plural gain controllable amplifiers. An amplified IF signal from stage 80 is AC coupled to a limiter 82, to a video IF detector 84, and to a sound IF detector 86 via a capacitive phase shifting network 87. Detectors 84 and 86 illustratively comprise four quadrant multipliers. A bandpass filter tank 85 coupled via terminals 22 and 23 to the output of limiter 82 is tuned to the video IF carrier. Limiter 82, detector 86 and tank 85 form a mixer for providing a 4.5 MHz FM intercarrier sound signal from the sound and video carrier components of the IF signal. The intercarrier sound signal from detector 86 is coupled via an amplifier 88, a terminal 21, a buffer 89, a 4.5 MHz bandpass filter 90 and terminals 18 and 19 to a network comprising cascaded, progressive limiting stages 91, 92 and 93 which provide an amplitude limited FM intercarrier sound signal to an FM detector 95. Detector 95 operates together with a discriminator tank circuit 96 coupled to terminals 15 and 16 for generating a demodulated baseband audio signal. The audio signal is applied to an audio signal processor stage (not shown) including power output audio amplifiers and loudspeakers.

Automatic gain control of the sound IF channel is achieved in response to a control voltage derived from the output of video IF detector 84. The detected output signal of detector 84 is coupled via an amplifier 78, a low pass AGC filter including a resistor 79 and a capacitor 81, coupled to a terminal 10, and an AGC amplifier 83 to a gain control input of sound IF amplifier stage 80.

The system of FIG. 1 also includes a suppressed sync decoder 100 designed in accordance with the EIA multiport standard. The baseband composite video signal developed at terminal 25 of circuit 45 is applied to a signal input of decoder 100 via buffer 57, which exhibits a suitable output driving impedance as specified by the EIA standard, e.g., 75 ohms. A baseband video signal with a restored horizontal sync component is provided at the output of decoder 100. The output signal of decoder 100 is fed to external AGC detector 61 via input DRS (decoder restored sync) of switch 58 when decoder 100 is in use.

Switch 58 can be a manual viewer controlled switch, or a microprocessor controlled electronic switch responsive to both user selection signals and automatic control signals received from the decoder, depending on the characteristics of a particular decoder system. Switch 58 is placed in a DRS position when decoder 100 is present and operative to decode a received suppressed sync television signal. Switch 58 is placed in a "NORM" (normal) position when decoder 100 is either absent or inoperative in the presence of a received television signal with proper (non-suppressed) sync.

The operation of noise inverter 56 is defeated, as discussed more fully hereinafter, when decoder 100 is operative to descramble a suppressed sync video signal by restoring the sync component to the video signal. Thus noise inverter 56 is prevented from distorting or destroying information such as coded digital information which may be contained in the vertical blanking interval of the scrambled television signal as discussed hereinabove. In this regard the scrambled suppressed sync signal containing such digital information, as applied to the input of decoder 100, may exhibit the form indicated by the waveform illustrated adjacent to the input of decoder 100. In the illustrated waveform, digital (binary) signal information is contained in a reference portion of a vertical blanking interval V, and suppressed horizontal sync components are respectively included in horizontal blanking interval portions of horizontal line intervals H.

The EIA multiport standard requires that the sync tip voltage of the restored sync video signal developed by decoder 100 be substantially equal to +1.0 volt under correct normal signal gain conditions. The more positive the sync tip voltage is, the higher the signal gain is under AGC control. Conversely, the less positive the sync tip voltage, the lower the signal gain is under AGC control. Thus, the AGC circuits adjust the gain of the receiver amplifiers to produce a correct video signal gain. The operation of amplifier 57 and external AGC detector 61 are used to modify this "normal" AGC operation to defeat the operation of noise inverter 56 which will now be discussed.

Figure 2:
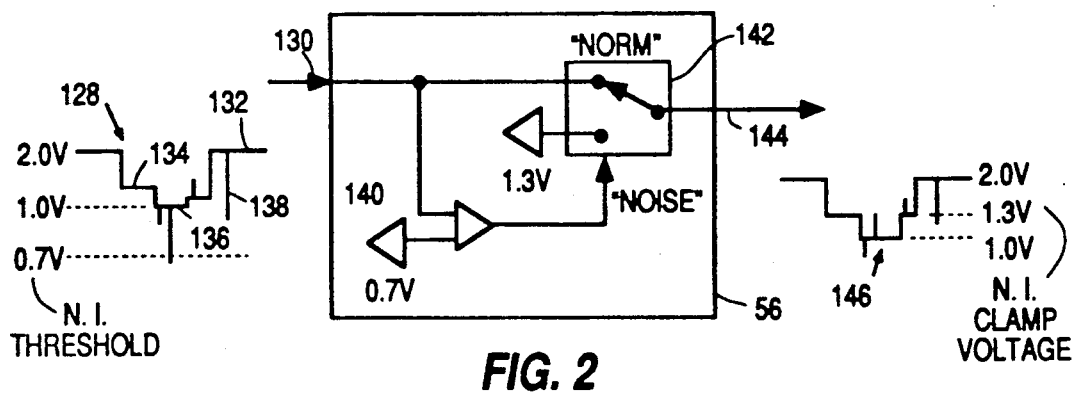
FIG. 2 is a block diagram representation showing the normal operation of an exemplary noise suppression or inverter circuit commonly employed within a standard integrated circuit.

The normal operation of a noise inverter 56 is shown in FIG. 2, wherein it is assumed an unscrambled video signal 128 is fed to input terminal 130 of noise inverter 56. Signal 128 has negative going blanking and sync pulses with a trace portion 132 having an exemplary 100 IRE voltage level of +2.0 volts, a blanking porch level 134, and a sync level 136 having an exemplary voltage level of 1.0 volts. Video signal 128 contains exemplary positive and negative noise pulses 138.

Noise inverter 56 has an exemplary threshold of +0.7 volts. Signals less positive than the threshold level are clipped or clamped. Thus, only noise pulses exceeding this threshold in the negative direction are effected. The signal at 130 is fed to a comparator 140 and an electronic switch 142. Comparator 140 is provided with an exemplary reference of 0.7 volts and switch 142 is provided with a +1.3 clamp voltage. The output from comparator 140 is fed to switch 142 as a switch control signal. Switch 142 normally conducts the signal appearing at input terminal 130 to output terminal 144. When a negative noise spike more negative than +0.7 volts occurs, switch 142, responsive to an output from comparator 140, will momentarily switch to the "noise" position and clamp the noise spike to +1.3 volts. Thus, in a sense, noise spikes more negative than +0.7 volts are inverted. This has the effect of suppressing any negative going spikes more negative than +0.7 volts which might otherwise appear in the signal appearing at output terminal 144. The waveform of the signal at output terminal 144 is shown at 146.

While there are no terminals provided for directly defeating the operation of noise inverter 56, according to an aspect of the invention, the operation of noise inverter 56 is defeated by reduction of the amplitude of the video signal at 130 by action of the AGC circuitry modifying the feedback by moving the sync tip 136 of signal 128 shown in FIG. 2 above and away from the noise inverter threshold voltage. Since the video amplitude is reduced below the normal amplitude before application to noise inverter 56, the amplitude of the video signal is restored to the desired level after the noise inverter external to IC 45 before application to decoder 100.

Figure 3:
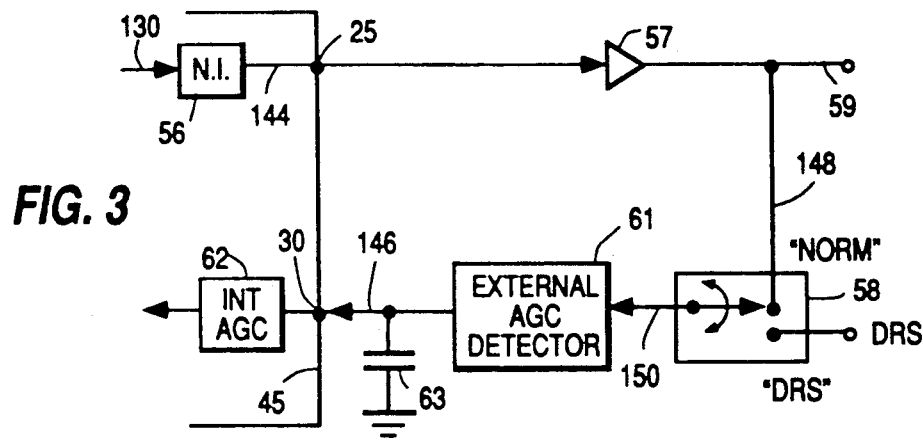
FIG. 3 is a block diagram representation showing apparatus according to aspects of the present invention for defeating the operation of a noise inverter incorporated in an IC.

Circuitry for defeating the operation of noise inverter 56 is shown in the block diagram of FIG. 3. Internal AGC detector 62 of integrated circuit 45 is designed so that a desired, correct signal level will be produced at signal output 144 of noise inverter 56 for a predetermined level of AGC feedback voltage developed across AGC filter capacitor 63 normally coupled to terminal pin 30. If the AGC feedback voltage developed at input pin 146 is lower than the predetermined amount, the amplification within IC 45 is decreased. As a result, the signal level at the input of noise inverter 56 is decreased with a corresponding decrease at output terminal 144. In accord with aspects of the present invention, the AGC feedback voltage at terminal pin 30 is intentionally modified to, in a manner of speaking, "trick" or "fool" the circuit into thinking that the signal level at 144 and amplification subsequent thereto is higher than nominal. This causes the amplification provided by the IC network 45 prior to noise inverter 56 to be lowered. This, in turn, reduces the signal level at input 130 of noise inverter 56 by 2-3 db. As a result, the lowest portion of the sync tips is caused to be less negative than the threshold required for operation of noise inverter 56, thus defeating the operation of noise inverter 56. The AGC feedback signal at 146 is modified by external AGC detector 61 which is coupled to internal AGC detector 62 of IC 45 via pin 30.

Since the output from noise inverter 56 at 144 is caused to be 2-3 db low, amplifier 57 is provided to make up for this loss so that the signal available at amplifier output 59 and switch input 148 is at the nominal level. Thus, the signal at 148 is a proper level video signal (i.e., as if the signal level at noise inverter 130 had not been modified) and can be fed to decoder 100 as a multiport video signal meeting the EIA multiport standard. In the exemplary embodiment, amplifier 57 also adjusts the DC offset of the signal at 148 so that the most positive peaks of the trace signal at 148 is at 100 IRE (maximum brightness).

The signal at 148 is fed to switch 58 which is provided for choosing the input source for input 150 of external AGC detector 61. In the exemplary embodiment, the "norm" position selects the signal at 148 for input to external AGC detector 61. When a decoder 100 is used and switch 58 is in the DRS (decoder restored sync) position, the decoder restored sync (DRS) output signal of decoder 100 is fed to input 150 of external AGC detector 61. As a result, decoder 100 is part of the feedback loop which the AGC circuit controls. It is noted that if the signal at 148 is a "correct" signal level with the arrangement shown in FIG. 3, noise inverter 56 is permanently disabled whether or not decoder 100 is utilized, and therefore external AGC detector 61 causes the signal fed to noise inverter 56 to have a reduced level signal. An alternative embodiment for selectively defeating the operation of noise inverter 56 with external AGC detector 61 still in the circuit will be discussed hereinafter in connection with FIG. 5.

Figure 4:
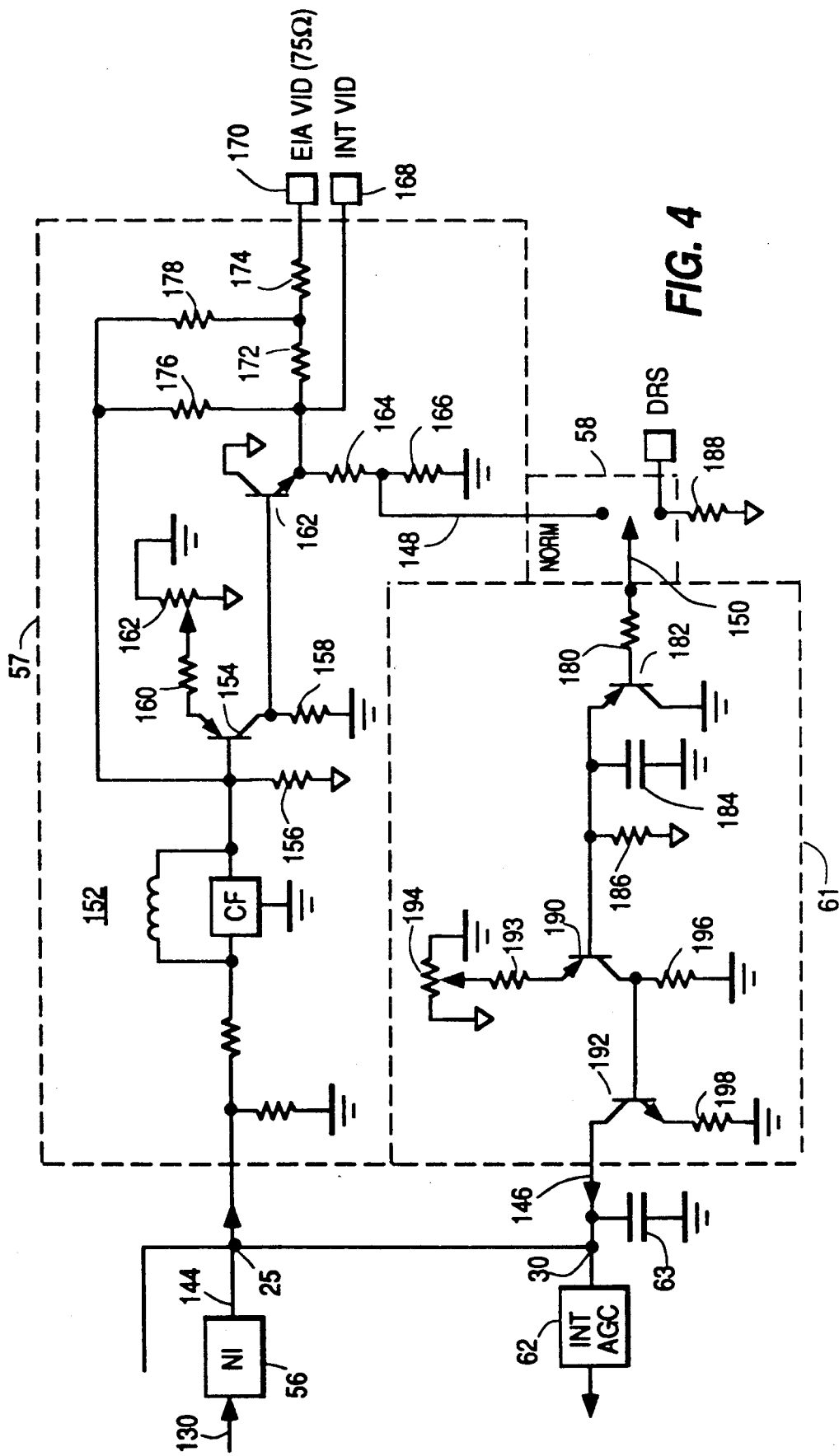
FIG. 4 is a schematic representation showning the internal circuitry of portions of the apparatus of FIG. 3.

FIG. 4 is a schematic showing the circuit details for amplifier 57 and external AGC detector 61. Buffer amplifier 57 accomplishes two things. Firstly, it amplifies the signal an additional 2-3 db to compensate for the loss of gain of 2-3 db instituted prior to the input of noise inverter 56 in order to defeat the operation of noise inverter 56. Secondly, it adjusts the DC level of the signal so that the maximum level of the trace portion is at 100 IRE (maximum white).

Noise inverter output signal at 144 is fed to a filter 152 which is a 4.5 Mhz sound intercarrier trap, and in turn to a PNP transistor 154 having a base electrode coupled to an exemplary power supply of five volts (not shown) through resistor 156, a collector electrode coupled to ground through a load resistor 158, and an emitter electrode coupled through a resistor 160 to a variable voltage source comprising a potentiometer 162 coupled between a power supply and ground. Transistor 154 provides the desired additional amplification, with potentiometer 162 being adjusted to provide the desired DC level. The shift in the DC level compensates for the shift caused by the AGC modification. The signal across load resistor 158 is coupled to a base electrode of an emitter follower NPN transistor 162 having an emitter electrode coupled to ground through divider resistors 164 and 166, and a collector electrode coupled to the power supply.

The video output terminal 59 shown in FIG. 3 is symbolic. In the exemplary embodiment shown in FIG. 4, for an internal video signal processed in the nominal manner by the remainder of the television receiver for processing by decoder 100, a video signal output is developed at a terminal 168 coupled at only the emitter electrode, an EIA multiport standard video signal is developed at terminal 170 coupled thereto through resistors 172 and 174. Feedback resistors 176 and 178 are coupled from the emitter electrode and the junction of resistors 172 and 174 respectively to the base electrode of transistor 154. The output impedance at terminal 170 is 75 ohms as dictated by the multiport standard.

The output signal at 148 derived from the junction of resistors 164 and 166 is fed to the "norm" terminal of switch 58. As stated hereinabove, the position of switch 58 determines which sync tip input signal will be provided to external AGC external detector 61 at input terminal 150. When no decoder 100 is turned on or provided, the switch 58 would be in the "normal" position to feed the output signal from transistor 162 to input terminal 150 of external detector 61. When a decoder 100 is operational in the circuit, switch 58 would be in the "DRS" position and feeds the decoder sync restored output signal to external AGC detector 61 so that the AGC circuit senses the restored sync tip level. Resistor 188 coupled between the DRS terminal and power supply is provided to comply with the EIA standard to pull up the DRS terminal to power supply voltage when decoder 100 is not connected and to provide a specified load impedance to the output of decoder 100.

The signal at 150 is coupled through an isolation resistor 180 to a base electrode of PNP transistor 182 having a grounded collector electrode, and an emitter electrode coupled to a low pass filter capacitor 184 and a resistor 186 coupled to the power supply. This arrangement functions as a negative peak detector. Transistor 182 conducts more highly as its base electrode becomes more negative. Thus, the larger the peak negative signal at the base electrode is, the more transistor 182 will conduct, and the lower will be the voltage across capacitor 184.

A PNP transistor 190 amplifies the voltage developed across capacitor 184. A base electrode of transistor 190 is coupled to receive the detected AGC voltage developed across capacitor 184 and has an emitter electrode coupled through a resistor 193 to a bias providing variable voltage potentiometer 194 coupled between the power supply and ground. The bias provided by potentiometer 194 is set for adjusting the DC offset of the AGC signal to compensate for variations of the DC level of the video AGC characteristics of the signal. A collector electrode of transistor 190 is coupled to ground through a resistor 196 and to a base electrode of a transistor 192. Transistor 192 has an emitter electrode coupled to ground through resistor 198 and a collector electrode coupled to AGC input line 146 of integrated circuit 45. Transistor 192 provides a voltage to current conversion for providing a current source drive to AGC capacitor 63 coupled between line 146 and ground.

Figure 5:
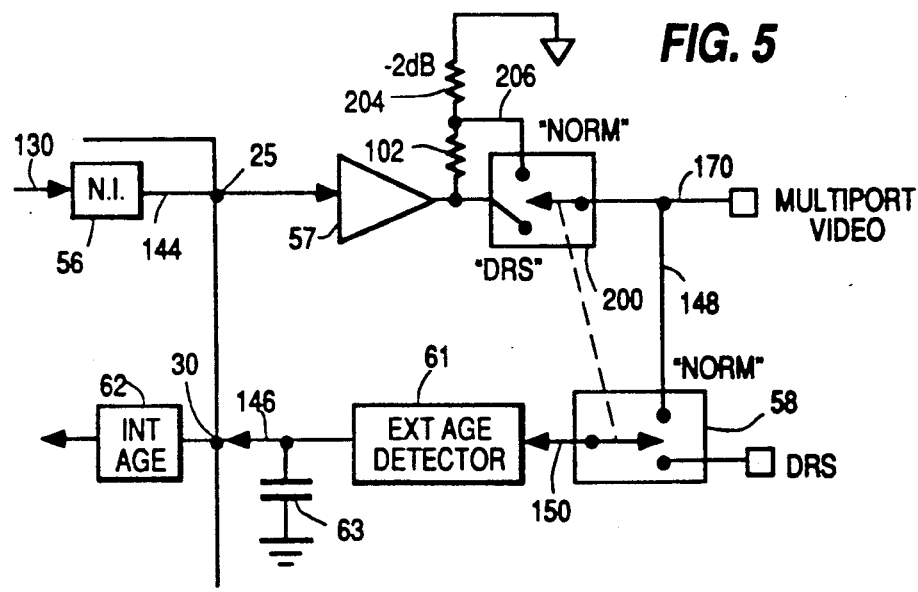
FIG. 5 is a block diagram representation showing an alternate embodiment of a portion of the apparatus shown in FIG. 3.

As noted earlier, the above discussed circuits provide a system wherein the integrated circuit built-in noise inverter 56 is permanently defeated. An alternate embodiment, wherein noise inverter 56 can be selectively defeated, is shown in FIG. 5. FIG. 5 is similar to the block diagram of FIG. 3 except that a switch 200 has been added between amplifier 57 and terminal 170 and divider resistors 202 and 204 have been added in parallel with the output of amplifier 57 and coupled between terminal 170 and the power supply.

Resistors 202 and 204 are attenuator resistors for providing at 206 an output signal from amplifier 57 which is 2 db less than the output signal otherwise available. Switch 200 has a "norm" and "DRS" position which can be ganged to the similarly labeled positions of switch 58. In the "DRS" position, when defeat of the operation of noise inverter 56 is desired, the operation is the same as with FIG. 3. In the normal position, when the operation of the noise inverter 56 is is desired, the signal at terminal 170 is reduced by 2 db. This causes the AGC detected by AGC detector 61 to be lowered which in turn causes the gain of the IF amplifiers internal to integrated circuit 45 to increase. This increase in gain brings the signal strength at 130 up to its normal operating level and the noise inverter 56 becomes operational.

The disclosed arrangement can also be used in conjunction with other television receivers such as a video cassette recorder (VCR). In addition, while the exemplary embodiment has been discussed with reference to an integrated circuit (IC) or chip, the invention may be used as well with sealed or potted modules and the like in which the internal circuitry is not available subsequent to the manufacture thereof for external electrical connection thereto or manipulation thereof except through terminals provided for such a purpose in a casing, housing, or enclosure.

What is claimed is:

1. In a television system, a signal processing apparatus comprising:
   amplification means for amplifying a signal having noise components,
   noise reduction means for reducing the noise of the signal produced by said amplification means when the amplitude of the signal produced by said amplification means exceeds a predetermined threshold,
   automatic gain control (AGC) means for effecting the gain of the amplification means responsive to a feedback signal indicative of an attribute of the signal produced by said noise reduction means, and
   means for selectively modifying the feedback signal to reduce the gain of the amplification means in order to reduce the amplitude of the signal produced by said amplification means below said predetermined threshold.

2. The signal processing system of claim 1 wherein the system further comprises additional amplification means after the predetermined sensing point for further amplifying the signal produced at the sensing point.

3. A signal processing system in a television receiver comprising:
   a first circuitry disposed within a housing and comprising signal processing means including a plurality of signal processing operations,
   a plurality of externally available terminals providing exclusive means of access to selected portions of the first circuitry means from external of the housing,
   a first terminal of said plurality of externally available terminals providing a processed signal for further signal processing by a second circuitry external of the housing,
   a second terminal of said plurality of externally available terminals adapted for receiving a normally provided feedback signal indicative of an attribute of said further signal processing, means within the housing for modifying the processing of the signal in response to the feedback signal received at the second terminal, and means external of the housing for further modifying the processing of the signal in response to the feedback signal by modification of the feedback signal so as to defeat the operation of at least one of the processing operations not otherwise externally available.

4. The signal processing system of claim 3 wherein the means within the housing decreases the amplification of the means for processing, and the system further comprises amplification means after the first terminal for further amplifying the signal the decreased amount of amplification.

5. A method for processing a signal in a television receiver including an integrated circuit (IC) having circuitry enclosed within a housing, said circuitry being electrically unaccessible external of the housing except through externally available electrodes disposed at the housing and coupled to respective circuitry, comprising the steps of:

coupling an input signal to said circuitry for processing by said circuitry within the IC, the processing of said input signal by said circuitry including a plurality of processing operations, providing a processed output signal external of the IC for further signal processing including amplification, providing a normally available feedback signal indicative of an attribute of the further processed signal, modifying the normally available feedback signal, and applying the changed feedback signal to the IC for defeating at least one of the processing operations of the IC.

6. A television system for processing unscrambled television signals with normal synchronization components in a first mode of operation and scrambled television signals with suppressed synchronization components in a second mode of operation, comprising:

means for controlling the gain of said television signals in response to a gain control signal to produce gain controlled television signals;

means for suppressing amplitude portions of said gain controlled television signals which exceed a threshold level to produce noise reduced versions of said television signals;

means responsive to said noise reduced version of said television signals for producing said gain control signal representative of the magnitude of said television signals; and means for selectively altering said gain control signal so that the amplitude of said gain controlled television signals coupled to said means for suppressing amplitude portions of said gain controlled television signals is reduced to a point at which said suppressed synchronization components of said scrambled video signals do not exceed said threshold during said second mode of operation.

7. The television system recited in claim 6, further including:

means for processing said noise reduced television signals; and wherein means coupled between said means for suppressing amplitude portions of said gain controlled television signals and said means for processing said noise reduced television signals to increase the amplitude of said noise reduced television signals to compensate for the reduction of the amplitude of said gain controlled television signals produced by said means for selectively altering said gain control signal.

8. The television system recited in claim 7, wherein:

said means for controlling the gain of said television signals, and said means for suppressing amplitude portions of said gain controlled television signals are included in an integrated circuit;

said means for producing said gain control signal includes a first amplitude detector internal to said integrated circuit and coupled to said means for suppressing amplitude portions of said gain controlled television signals, and a second amplitude detector external to said integrated and coupled between said means for suppressing amplitude portions of said gain controlled television signals and said first amplitude detector; and said means for selectively altering said gain control signal is coupled intermediate said first and second amplitude detectors external to said integrated circuit.

* * * * *